United States Patent
An et al.

(10) Patent No.: US 9,641,748 B2
(45) Date of Patent: May 2, 2017

(54) MOBILE TERMINAL AND CONTROLLING METHOD THEREFOR

(71) Applicant: LG ELECTRONICS INC., Seoul (KR)

(72) Inventors: Hyeji An, Seoul (KR); Juhee Jo, Seoul (KR); Hyungshin Park, Seoul (KR); Egun Jung, Seoul (KR); Sunok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/036,124

(22) PCT Filed: Nov. 10, 2014

(86) PCT No.: PCT/KR2014/010729
§ 371 (c)(1),
(2) Date: May 12, 2016

(87) PCT Pub. No.: WO2015/093732
PCT Pub. Date: Jun. 25, 2015

(65) Prior Publication Data
US 2016/0295104 A1   Oct. 6, 2016

(30) Foreign Application Priority Data

Dec. 20, 2013   (KR) .................. 10-2013-0160121

(51) Int. Cl.
*H04N 5/232* (2006.01)
*H04M 1/725* (2006.01)
(Continued)

(52) U.S. Cl.
CPC ....... *H04N 5/23216* (2013.01); *G06F 3/0488* (2013.01); *G06F 3/04845* (2013.01);
(Continued)

(58) Field of Classification Search
None
See application file for complete search history.

(56) References Cited

U.S. PATENT DOCUMENTS

2004/0246360 A1   12/2004   Stavely et al.
2013/0076918 A1*   3/2013   Park ................ H04N 1/00251
                                                            348/207.11
2014/0204244 A1*   7/2014   Choi ................ H04N 5/23222
                                                            348/231.99

FOREIGN PATENT DOCUMENTS

KR   10-2006-0013085 A   2/2006
KR   10-2010-0018152 A   2/2010
(Continued)

*Primary Examiner* — James Hannett
(74) *Attorney, Agent, or Firm* — Birch, Stewart, Kolasch & Birch, LLP

(57) ABSTRACT

Disclosed is a mobile terminal capable of restoring an unseen area, after taking a photograph, and a control method therefor. The mobile terminal, according to the present invention, can comprise: a camera for taking the photograph; a memory for storing data; a display unit for displaying, as a preview image, a partial area of an image inputted to the camera; and a control unit for taking the photograph of the entire image inputted to the camera when a photographing command is inputted, and controlling the partial area of the taken photograph to be displayed when a display command for the taken photograph is received. At this time, the control unit controls the entire area of the taken photograph to be displayed on the display unit when an editing command for the taken photograph is received, and can cut out a cropped area from the entire area of the taken photograph and store the same when the cropped area is set on the entire area of the taken photograph.

16 Claims, 15 Drawing Sheets

(51) Int. Cl.
  *H04N 5/262* (2006.01)
  *G06F 3/0484* (2013.01)
  *G06F 3/0488* (2013.01)

(52) U.S. Cl.
  CPC .... *H04M 1/72522* (2013.01); *H04N 5/23293* (2013.01); *H04N 5/2628* (2013.01); *H04M 2250/22* (2013.01); *H04M 2250/52* (2013.01)

(56) References Cited

FOREIGN PATENT DOCUMENTS

KR   10-2010-0106675 A   10/2010
KR   10-2013-0032776 A   4/2013

\* cited by examiner

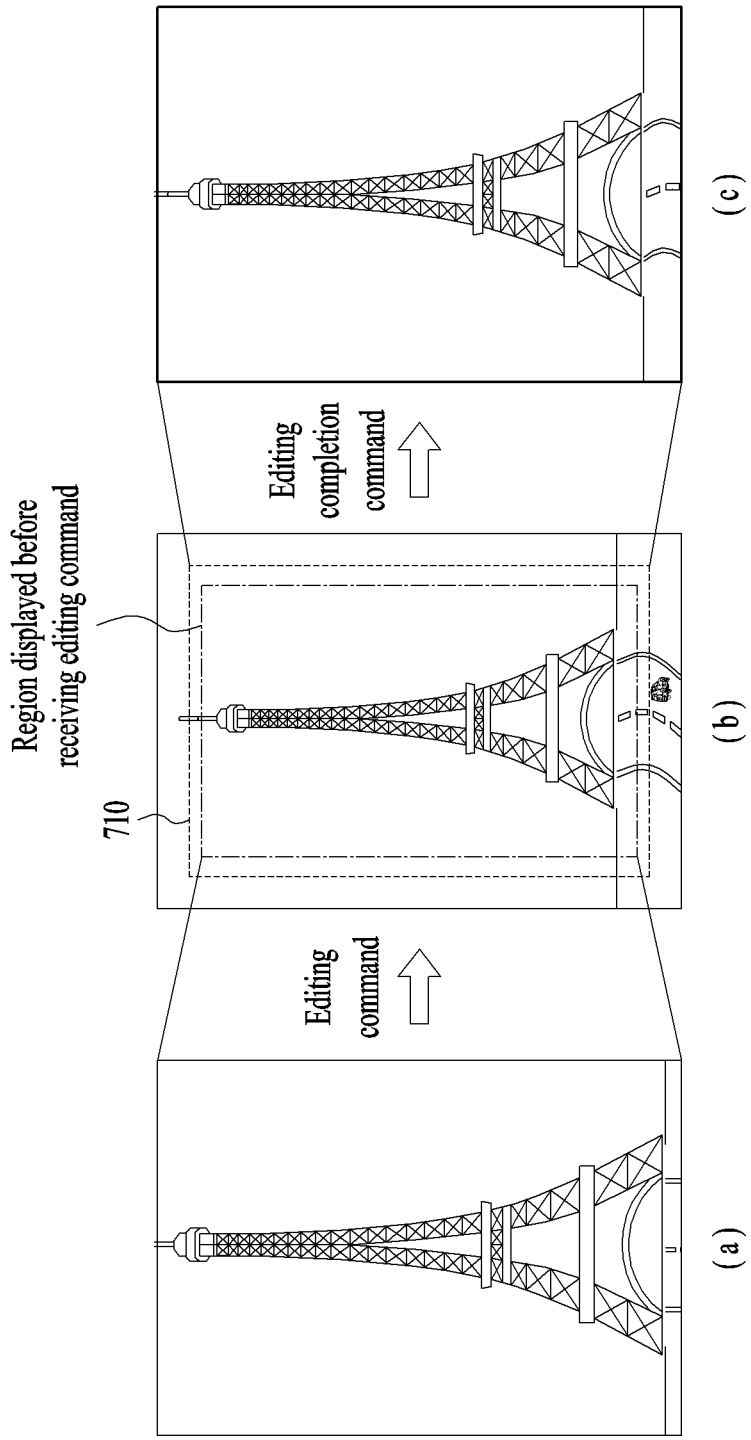

FIG. 8A
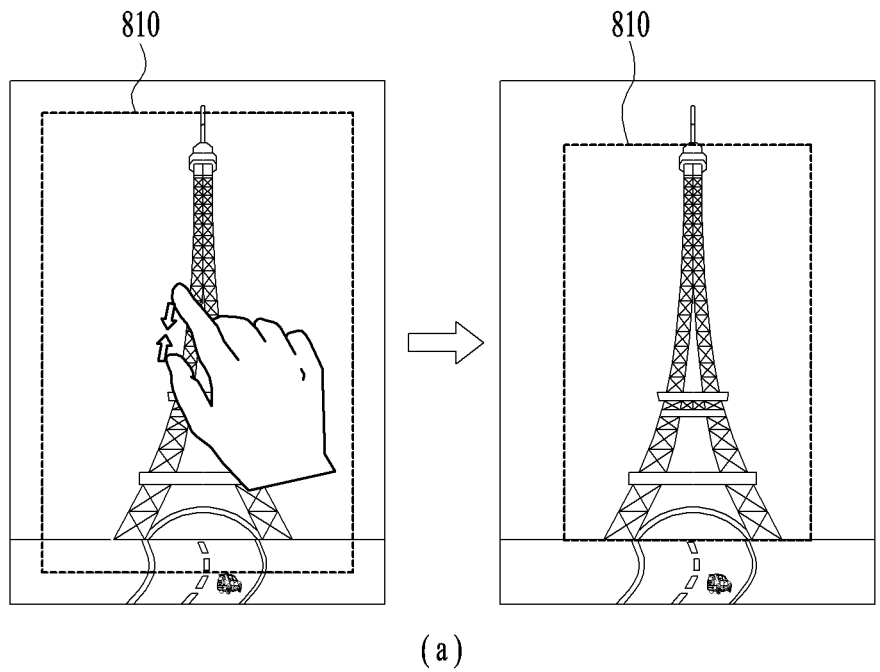
(a)
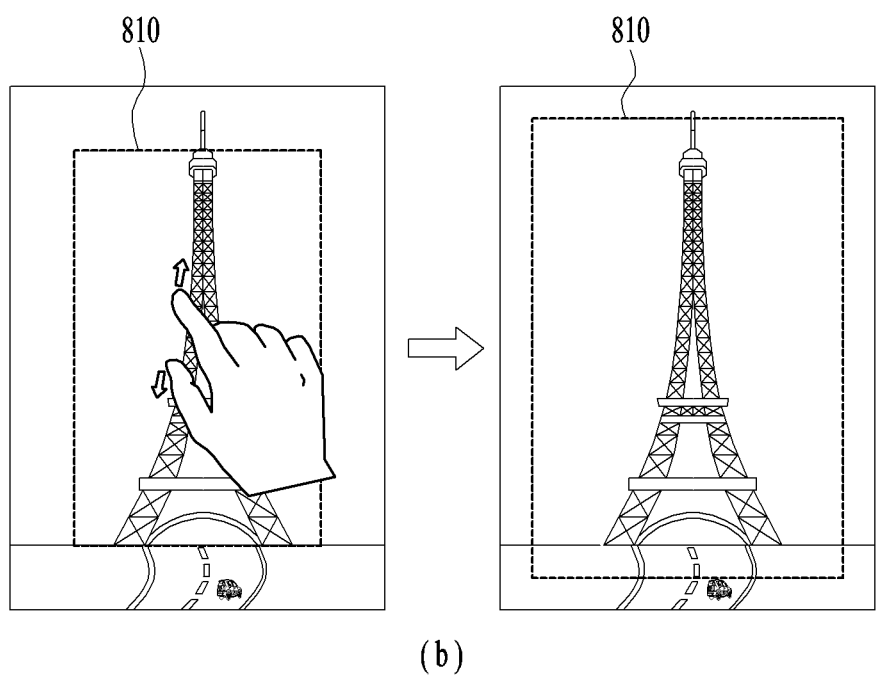
(b)

Pointer is dragged to move in right direction

FIG. 10
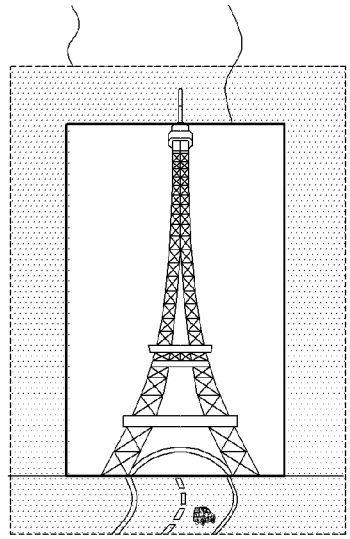
(a)
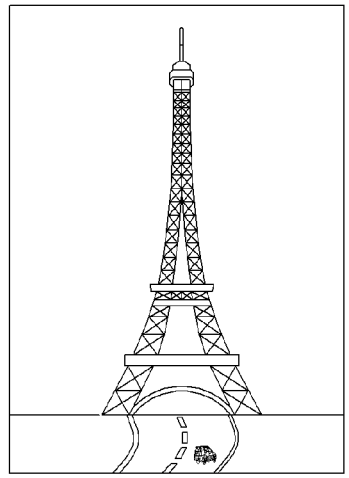
(b)
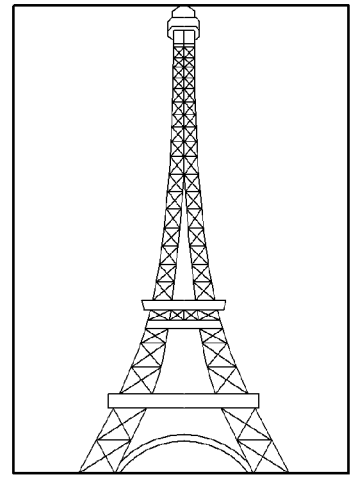
(c)
FIG. 11A
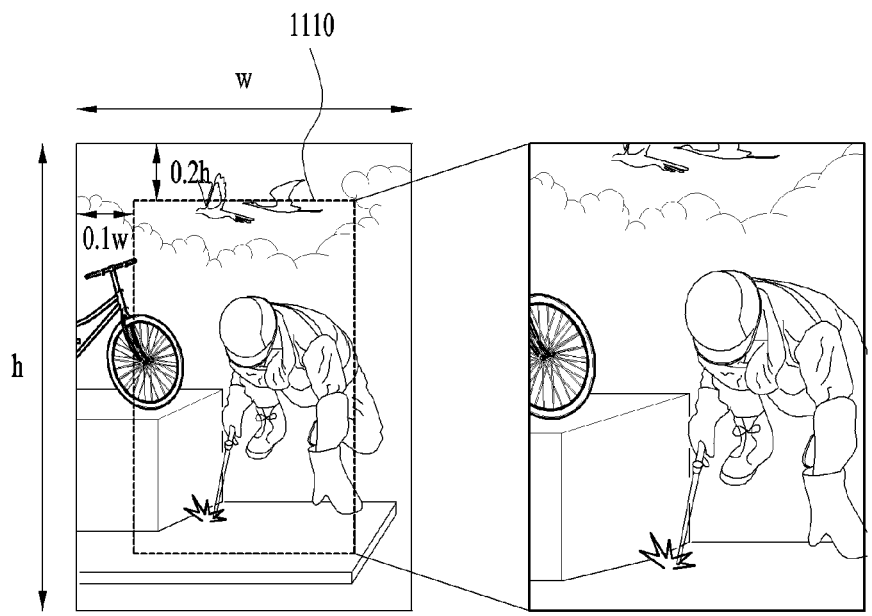
Photo provided after editing completion

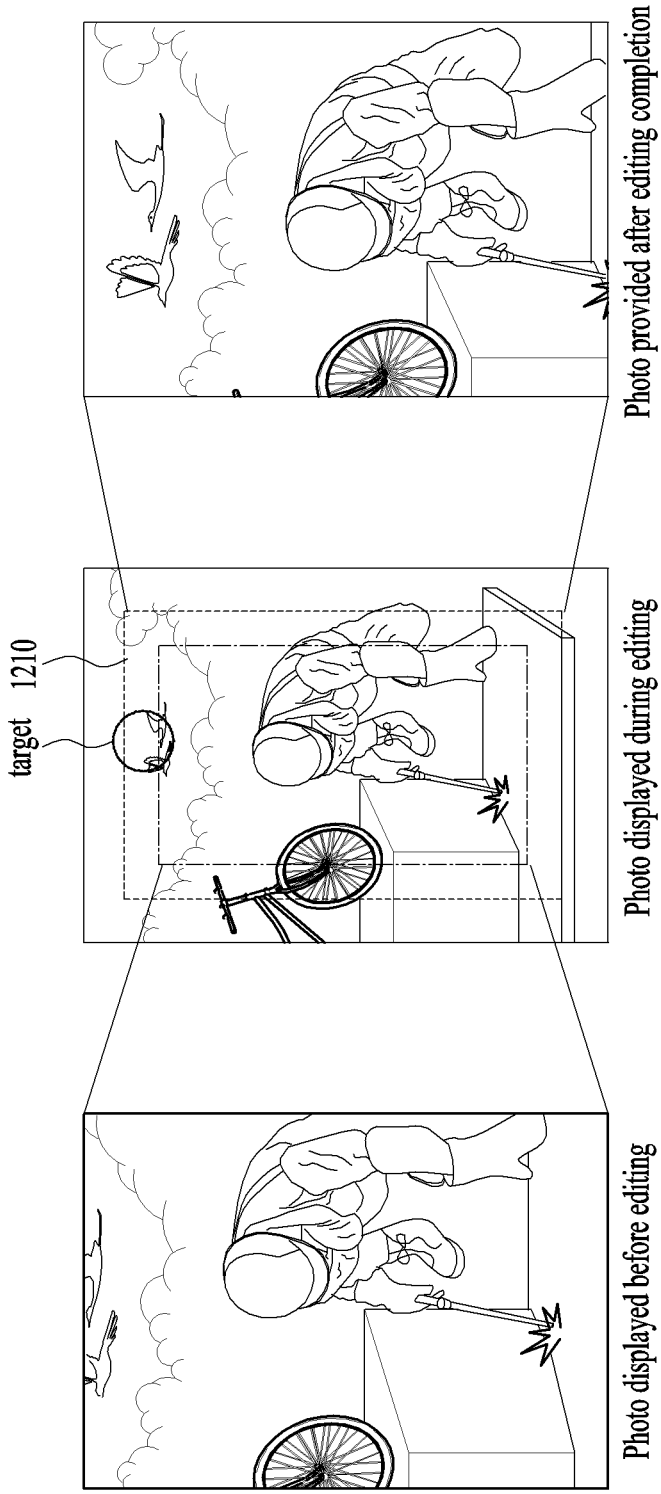

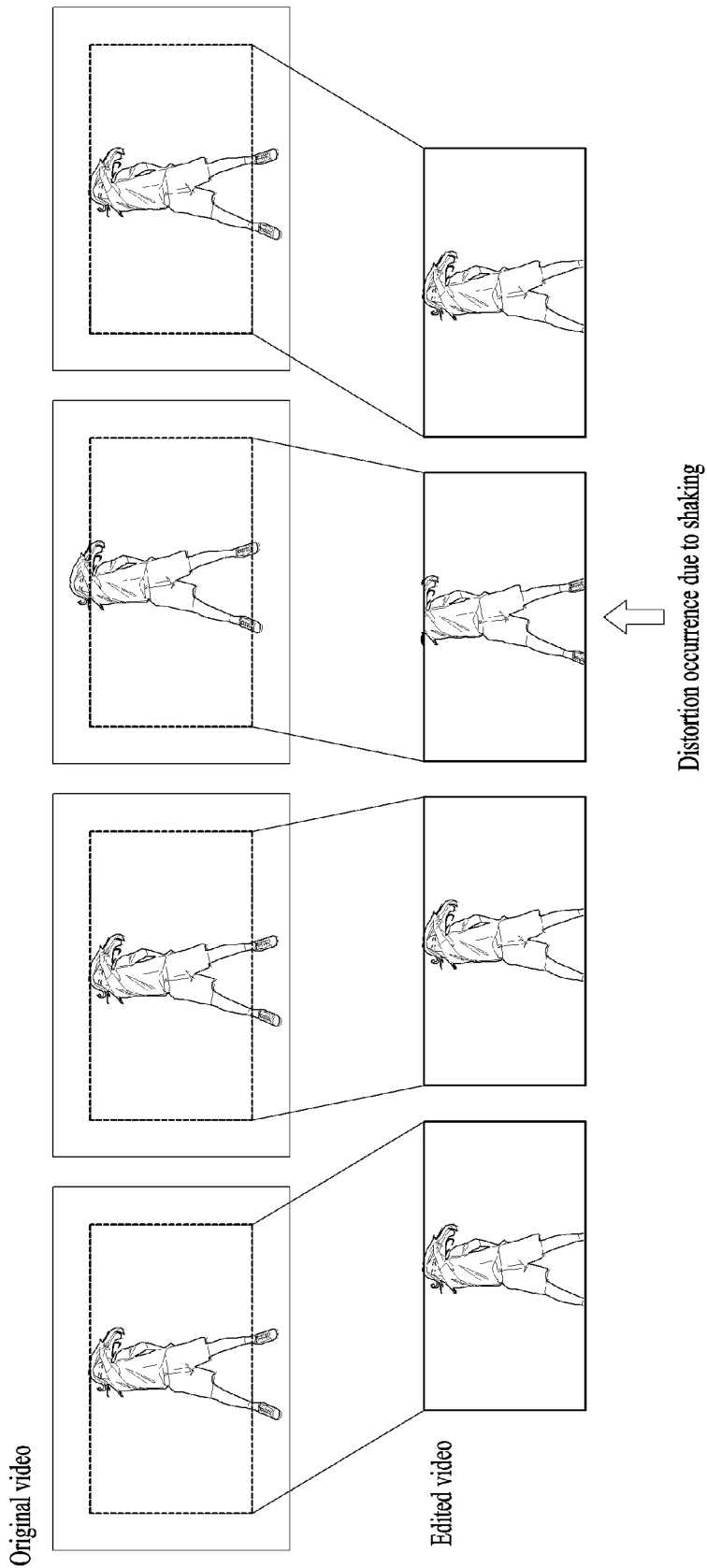

MOBILE TERMINAL AND CONTROLLING METHOD THEREFOR

CROSS REFERENCE TO RELATED APPLICATIONS

This application is the National Phase of PCT International Application No. PCT/KR2014/010729, filed on Nov. 10, 2014, which claims priority under 35 U.S.C. 119(a) to Patent Application No. 10-2013-0160121, filed in the Republic of Korea on Dec. 20, 2013, which is hereby expressly incorporated by reference into the present application.

TECHNICAL FIELD

The present invention relates to a mobile terminal and controlling method therefor, by which an unseen region failing to be viewed by a user can be restored after taking a photo.

BACKGROUND ART

Terminals can be classified into mobile/portable terminals and stationary terminals. In particular, the mobile terminals can be further classified into handheld terminals and vehicle mounted terminals according to possibility of user's direct portability.

As functions of the terminal are getting diversified, the terminal tends to be implemented as a multimedia player provided with complex functions such as photographing of photos or videos, playback of music or video files, game play, broadcast reception and the like for example.

To support and increase the terminal functions, it may be able to consider the improvement of structural parts and/or software parts of the terminal.

After a photo has been taken through a mobile terminal, a user may edit the taken photo to fit user's taste. If the user determines that a view angle of the taken photo is too large, the user can edit the photo appropriately by cropping a partial region from the taken photo. However, a current mobile terminal fails to provide a method of forcing the view angle of the taken photo to be increased despite that a user determines that the view angle of the taken photo is not sufficiently large.

Hence, the present invention intends to disclose a mobile terminal capable of increasing a view angle of a taken photo after taking the photo.

DISCLOSURE OF THE INVENTION

Technical Task

The technical task of the present invention is to provide a mobile terminal, by which user convenience can be enhanced.

In particular, the present invention intends to provide a mobile terminal, by which an unseen region failing to be viewed by a user can be restored after taking a photo.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a mobile terminal according to one embodiment of the present invention includes a camera for photographing, a memory for storage of data, a display unit configured to display a partial region of an image inputted to the camera as a preview image, and a controller, if a photographing command is inputted, taking a photo by targeting an entire image inputted to the camera, the controller, if a display command for displaying the taken photo is received, controlling a partial region of the taken photo to be displayed, the controller, if an editing command for editing the taken photo is received, controlling an entire region of the taken photo to be displayed through the display unit, the controller, if a crop region in the entire region of the taken photo is set, cropping the crop region from the entire region of the taken photo and then saving the crop region.

To further achieve these and other advantages and in accordance with the purpose of the present invention, as embodied and broadly described, a mobile terminal according to another embodiment of the present invention may include a camera for photographing, a memory for storage of data, a display unit configured to display a partial region of an image inputted to the camera as a preview image, and a controller, if a photographing command is inputted, creating a $1^{st}$ photo by targeting an entire image inputted to the camera and creating a $2^{nd}$ photo as the preview image, the controller, if a display command for displaying the taken photo is received, controlling the $2^{nd}$ photo to be outputted out of the $1^{st}$ photo and the $2^{nd}$ photo, the controller, if an editing command for editing the $2^{nd}$ photo is received, controlling the $1^{st}$ photo to be displayed through the display unit, the controller, if a crop region in the entire region of the taken photo is set, cropping the crop region from the entire region of the taken photo and then saving the crop region.

To further achieve these and other advantages and in accordance with the purpose of the present invention, as embodied and broadly described, a method of controlling a mobile terminal according to one embodiment of the present invention may include the steps of displaying a partial region of an image inputted to a camera as a preview image, if a photographing command is inputted, taking a photo by targeting an entire image inputted to the camera, if a display command for displaying the taken photo is received, displaying a partial region of the taken photo, if an editing command for editing the taken photo is received, displaying an entire region of the taken photo to through a display unit, and if a crop region in the entire region of the taken photo is set, cropping the crop region from the entire region of the taken photo and then saving the crop region.

Technical tasks obtainable from the present invention are non-limited by the above-mentioned technical tasks. And, other unmentioned technical tasks can be clearly understood from the following description by those having ordinary skill in the technical field to which the present invention pertains.

Advantageous Effects

The present invention can provide an effect of providing a mobile terminal, by which user convenience can be enhanced.

In particular, the present invention can provide an effect of providing a mobile terminal, by which an unseen region failing to be viewed by a user can be restored after taking a photo.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 7 is a diagram for one example of a user interface provided to crop a partial region from an entire region of a taken photo.

FIGS. 8A to 8C are diagrams for one example of changing a size and location of a region enclosed by a guide line in response to a user input.

FIG. 10 is a diagram for comparison between a $1^{st}$ photo and a $2^{nd}$ photo.

FIG. 11A and FIG. 11B are diagrams for one example that a position of a region to be cropped is collectively applied to a plurality of photos.

FIG. 12A and FIG. 12B are diagrams for one example of collectively editing a plurality of photos with reference to a target set in a specific photo.

FIG. 13A and FIG. 13B are diagrams for one example to describe a process for determining a region to crop per frame.

BEST MODE FOR INVENTION

In the following description, a mobile terminal related to the present invention is described in detail with reference to the accompanying drawings.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

Mobile terminals described in the present specification may include mobile phones, smart phones, digital broadcast receivers, PDA (personal digital assistants), PMP (portable multimedia players), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
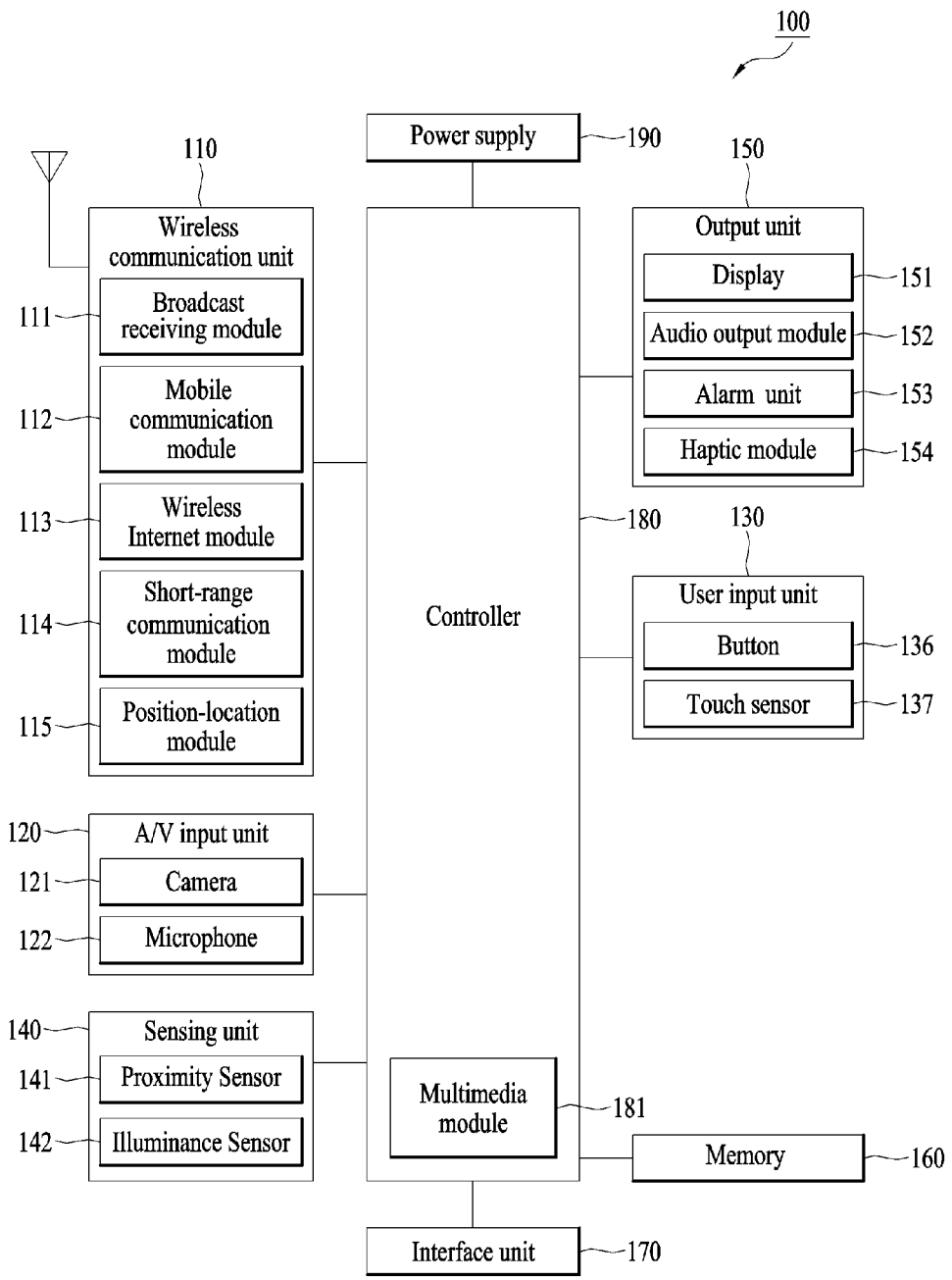
FIG. 1 is a block diagram of a mobile terminal related to one embodiment of the present invention.

FIG. 1 is a block diagram of a mobile terminal in accordance with an embodiment of the present invention. The mobile terminal 100 shown in FIG. 1 may include a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above components are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a location information module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information may mean information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may be implemented in form of an electronic program guide (EPG) of digital multimedia broadcasting (DMB), an electronic service guide (ESG) of digital video broadcast-handheld (DVB-H), or the like.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), media forward link only (MediaFLO), digital video broadcast-handheld (DVB-H), Convergence of Broadcasting and Mobile Service(DVB-CBMS), Open Mobile Alliance-BroadCAST (OMA-BCAST), China Multimedia Mobile Broadcasting (CMMB), Mobile Broadcasting Business Management System(MBBMS), integrated services digital broadcast-terrestrial (ISDB-T), and the like. Optionally, the broadcast receiving module 111 can be configured suitable for other broadcasting systems as well as the above-explained digital broadcasting systems.

The broadcast signal and/or broadcast associated information received by the broadcast receiving module 111 may be stored in a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA), LTE (long term evolution), and so on. Such wireless signals may include a voice call signal, a video call signal, or data of various types according to text/multimedia message transceivings, among others.

The wireless internet module 113 means a module for Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution), etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 means a module for short-range communications. Short-range communication technologies may include Bluetooth, radio frequency identification (RFID), infrared data association (IrDA), ultra-wideband (UWB), ZigBee, to name a few.

The location information module 115 is a module configured to obtain a location of a mobile terminal. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 may include a camera 121, a microphone 122 and the like. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal in a particular mode, such as phone call mode, recording mode, voice recognition mode or the like. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 includes gyroscopic sensor, acceleration sensor, geomagnetic sensor, and the like.

As an example, consider the mobile terminal 100 being configured as a slide-type phone. In this configuration, the sensing unit 140 may sense whether a sliding portion of the slide-type phone is open or closed. Other examples include the sensing unit 140 sensing the presence or absence of power provided by the power supply 190, the presence or absence of a coupling or other connection between the interface unit 170 and an external device. And, the sensing unit 140 may include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) related to a phone call. As another example, if the mobile terminal 100 is in a video call mode or a photographing mode, the display 151 may display images which are associated with these modes, the UI or the GUI.

The display module 151 may be implemented using known display technologies including, for example, a liquid crystal display (LCD), a thin film transistor-liquid crystal display (TFT LCD), an organic light-emitting diode display (OLED), a flexible display and a three-dimensional (3D) display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touchscreen'), it is able to use the display 151 as an input device as well as an output device. For instance, if the touch sensor is configured as a touch film, a touch sheet, a touchpad or the like, it is stacked on the display 151 to form a layer structure. Alternatively, the touch sensor is included in the configuration of the display 151 to have a built-in configuration.

The touch sensor 137 can be configured to convert a pressure applied to a specific portion of the display 151 or a variation of a capacitance generated from a specific portion of the display 151 into an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers data corresponding to the processed signal(s) to the controller 180. Therefore, the controller 180 is able to know whether a prescribed portion of the display 151 is touched.

Figure 2:
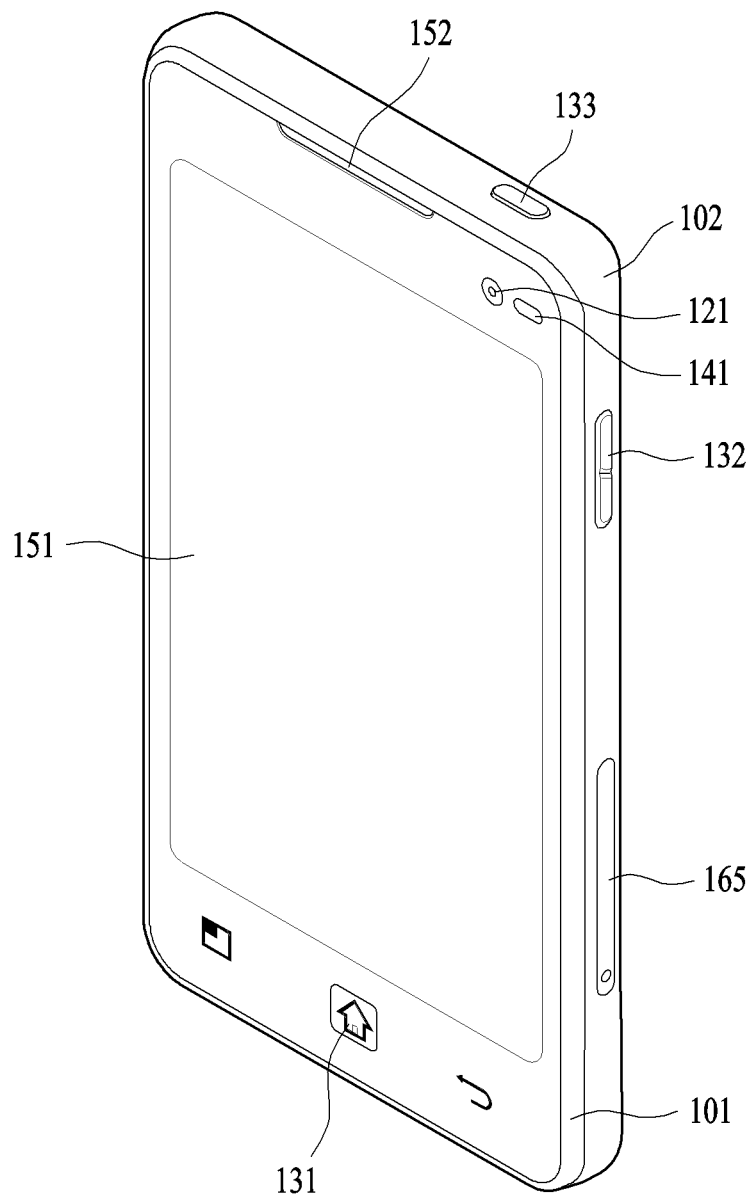
FIG. 2 is a front perspective diagram of a mobile terminal related to one embodiment of the present invention.

Referring to FIG. 2, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio signals relating to a particular function (e.g., call received, message received, etc.). The audio output module 152 may include a receiver, a speaker, a buzzer, and the like.

The alarm unit 153 outputs a signal for announcing the occurrence of a particular event associated with the mobile terminal 100. Typical events occurring in the mobile terminal may include a call received event, a message received event, a touch input received event and the like. The alarm unit 153 is able to output a signal for announcing the event occurrence by way of vibration as well as video or audio signal. For instance, the video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory 160 is generally used to store programs for operations of the controller 180 and may temporarily store input/output data (e.g., phonebook, message, still pictures, moving pictures, etc.). Moreover, data for various patterns of vibration and/or sound outputted in case of a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, magnetic disk, optical disk, or other similar memory or data storage device. And, the mobile terminal 100 is able to operate in association with a web storage for performing a storage function of the memory 160 on Internet.

The interface unit 170 is often implemented to play a role as a passage to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. For instance, a wired/wireless headset port, an external charger port, a wired/wireless data port, a memory card port, a port for coupling to a device having an identity module, audio input/output ports, video input/output ports, an earphone port and/or the like may be included in the interface unit 170.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal or a portable terminal according to one embodiment of the present invention.

The mobile terminal 100 shown in the drawing has a bar type terminal body, by which the present invention is non-limited. Yet, the mobile terminal 100 may be implemented in a variety of different configurations, in which at least two bodies are coupled together in a relatively movable manner. Examples of such configurations include slide-type, folder-type, swing-type and combinations thereof.

The body of the mobile terminal includes cases 101, 102 and 103 configuring an exterior thereof. In the present embodiment, the cases can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the cases 101 and 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 3:
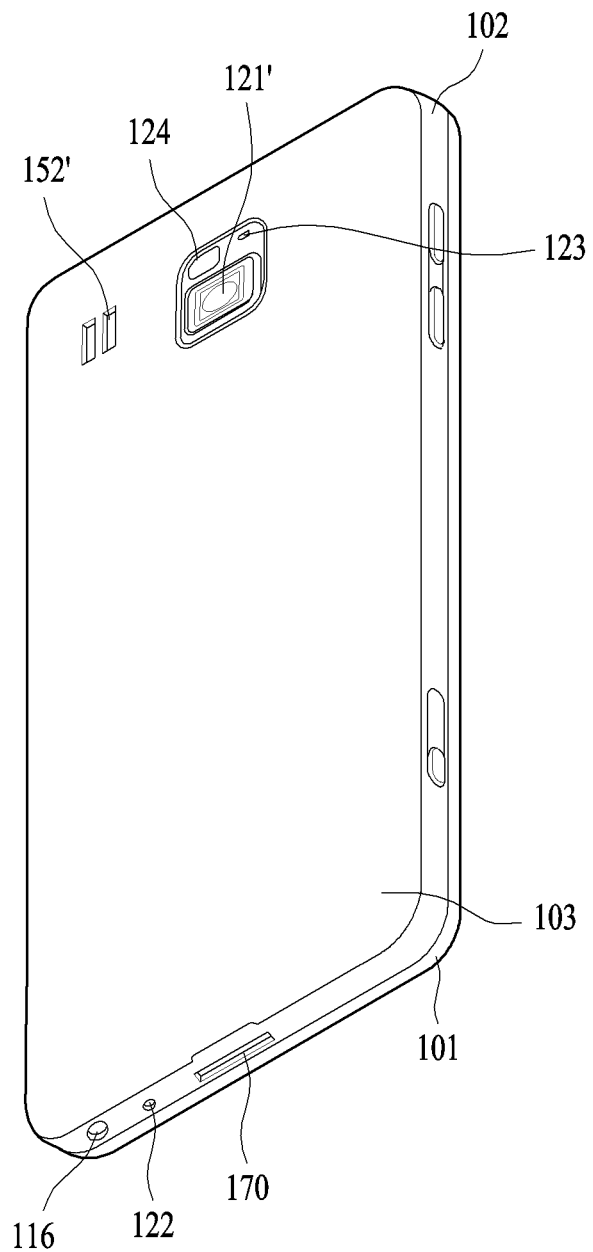
FIG. 3 is a rear perspective diagram of a mobile terminal related to one embodiment of the present invention.

FIG. 3 is a perspective diagram of a backside of the portable terminal shown in FIG. 2.

Referring to FIG. 3, a camera 121' can be additionally provided to a backside of the terminal body, and more particularly, to the rear case 102. The camera 121' has a photographing direction that is substantially opposite to that of the former camera 121 shown in FIG. 2 and may have pixels differing from those of the former camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

A power supply unit 190 configured to supply power to the mobile terminal 100 is loaded in the terminal body. The power supply unit 190 may be built in the terminal body or attached to the terminal body to be externally detachable.

A touch pad 135 may be additionally loaded in the rear case 102 to detect a touch. The touch pad 135 may be implemented in the optical transmittive type for the display 151. In this case, if the display unit 151 is configured to output visual information from both sides (i.e., front and rear sides of the mobile terminal), the visual information is recognizable through the touch pad 135. The information outputted from both sides may be controlled by the touch pad 135.

Meanwhile, as a display dedicated to the touch pad 135 is separately installed, a touchscreen may be disposed on the rear case 102.

The touch pad 135 operates in mutual relation with the display unit 151 of the front case 101. The touch pad 135 may be disposed in rear of the display unit 151 in parallel. And, the touch pad 135 may have a size equal to or smaller than that of the display unit 151.

For clarity and convenience of the following description, assume that a mobile terminal 100 mentioned in the following description includes at least one of the components shown in FIG. 1. In particular, assume that a mobile terminal 100 according to the present invention includes the camera 121, the display 151, the memory 160 and the controller 180 among the components shown in FIG. 1.

If the display unit 151 includes a touchscreen, implementation of the present invention can be further facilitated. Hence, in the description of the following embodiments, assume that the display unit 151 includes the touchscreen. If the display unit 151 does not include the touchscreen, the mobile terminal according to the present invention may further include a separate input device configured to receive a user input substituted for a touch input or the like.

In the following description, a mobile terminal 100 according to the present invention is explained in detail with reference to FIG. 4.

Figure 4:
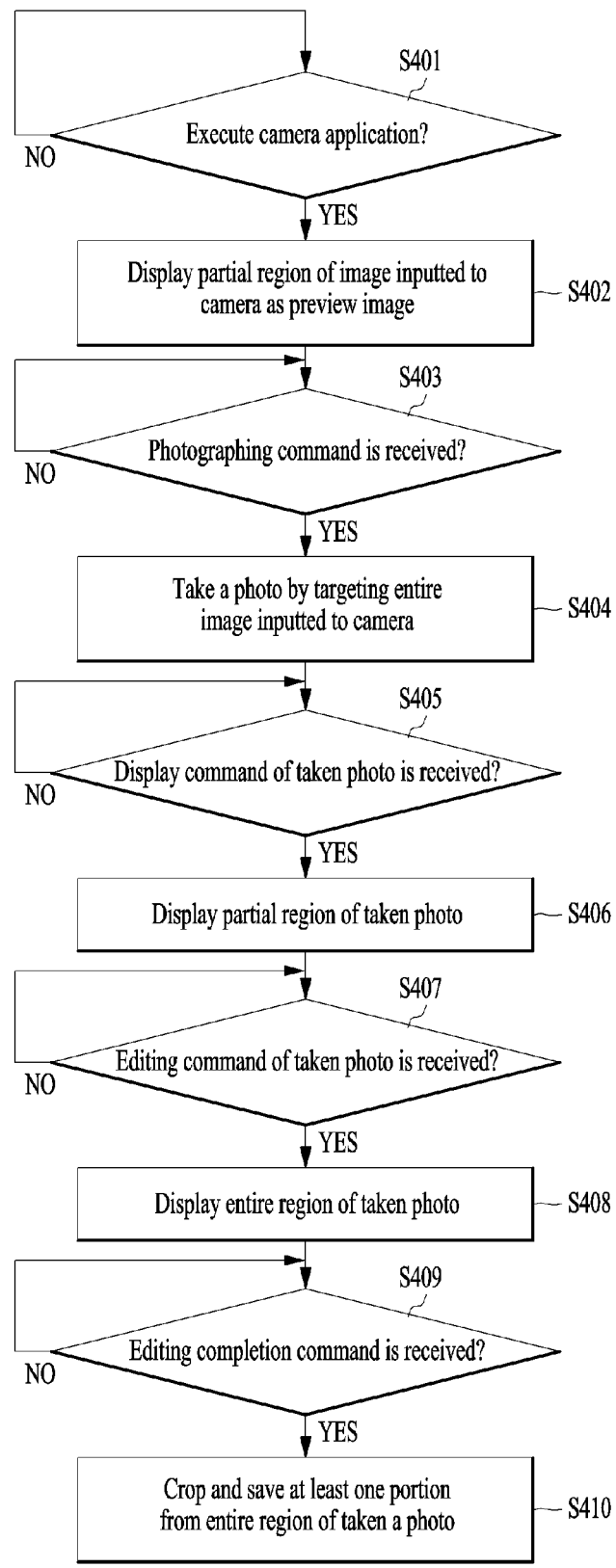
FIG. 4 is an operating flowchart of a mobile terminal according to the present invention.

FIG. 4 is an operating flowchart of a mobile terminal 100 according to the present invention.

First of all, if an application of the camera 121 is executed [S401], the controller 180 can control a partial region of an original image, which is inputted through the camera 121 by real time, to be displayed as a preview image [S402]. In this case, the original image means that an image focused on a light receiving sensor by penetrating a lens of the camera 121 is digitally processed to fit a preset format. And, the preview image may mean a partial region of the original image.

Figure 5:
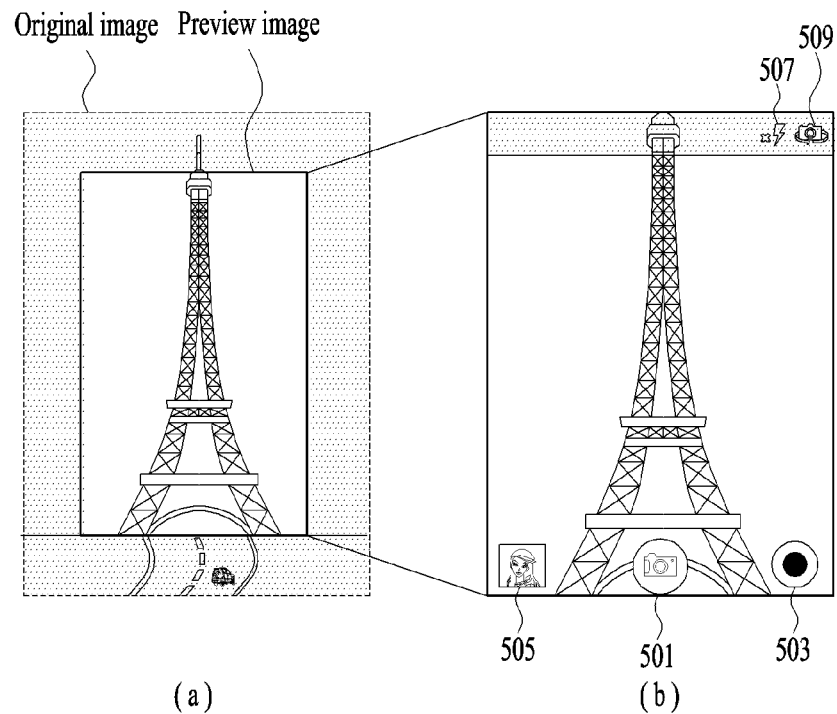
FIG. 5 is a diagram for comparison between an original image and a preview image.

For instance, FIG. 5 is a diagram for comparison between an original image and a preview image.

Referring to FIG. 5 (*a*), a boundary of a dotted line may indicate an original image, while a boundary of a solid line may indicate a preview image. Like the examples shown in FIG. 5 (*a*) and FIG. 5 (*b*), the controller 180 can determine a partial region of an original image as a region that will be outputted as a preview image through the display unit 151.

Thereafter, like the example shown in FIG. 5 (*b*), the controller 180 can output the preview image in a manner of enlarging the preview image to fit a size of the display unit 151. Since the preview image is an extraction of a partial region of the original image, the partial region of the original image can be outputted through the display unit 151 instead of the entire region of the original image.

While the preview image is outputted, settings of the camera 121 can be adjusted or various objects for a photographing can be displayed.

For instance, according to the example shown in FIG. 5 (*b*), a shot button 501 for inputting a photographing command, a photographing mode toggle button 503 for setting a photographing mode of the camera 121 to a photo taking or a video making, a thumbnail button 505 for displaying a thumbnail of a recently taken photo, a camera switch button 507 for selecting at least one of a front camera 121 and a rear camera 121, and a flash button 509 for selecting whether to automatically turn on the flash in accordance with light intensity or whether to turn on or off the flash are displayed on the preview image.

The above-listed buttons may not be necessarily displayed all the time. And, it is a matter of course that various objects for adjusting the settings of the camera 121 can be displayed on the preview image as well as the above-listed buttons.

A user manipulates objects displayed on the preview image to adjust the settings of the camera 121 or to take photos or videos.

If a photographing command is inputted [S403], the controller 180 can create a photo by capturing the original image [S404]. In this case, the photographing command may include a touch to the shot button shown in FIG. 5 (*b*) or may be inputted through a voice or a manipulation of an externally exposed physical button.

If a user input for displaying a taken photo is received [S405], the controller 180 can control a partial region of the taken photo to be outputted through the display unit 151 [S406].

For instance, if a specific photo is selected from a taken photo list, the controller 180 can control a partial region of the entire region of the selected photo to be outputted. In doing so, the controller 180 can determine a region, which is to be outputted through the display unit 151, in the whole region of the taken photo to fit a position and size of the preview image. This is to consider user's intention desiring to take the preview image intact. Since the partial region of the taken photo is outputted through the display unit 151, the user may not be able to view the entire region of the taken photo.

Figure 6:
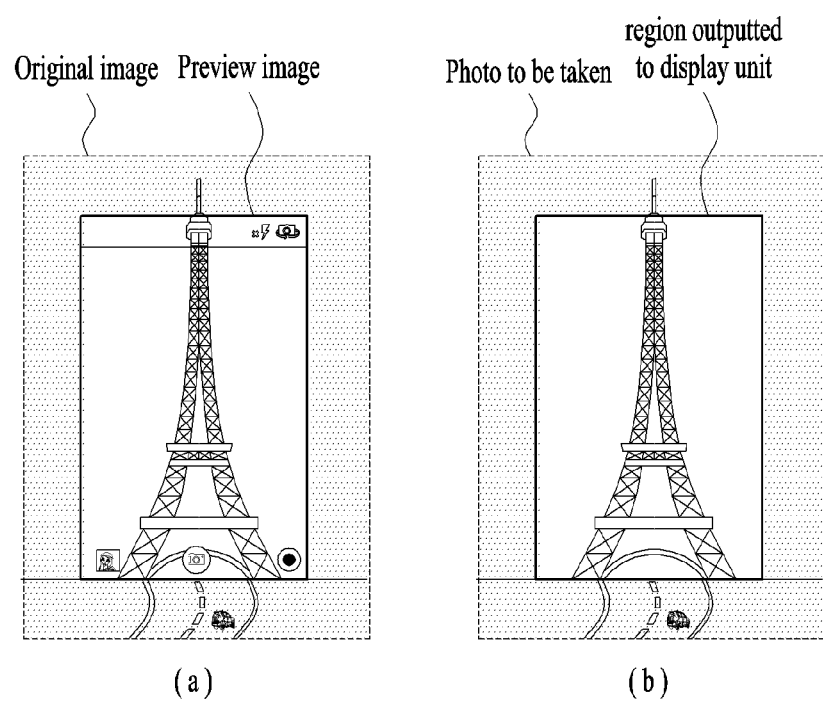
FIG. 6 is a diagram for comparison among an original image, a preview image and a taken photo.

For instance, FIG. 6 is a diagram for comparison among an original image, a preview image and a taken photo.

In FIG. 6 (*a*), a boundary of a dotted line indicates an original image and a boundary of a solid line indicates a preview image. In FIG. 6 (*b*), a boundary of a dotted line may indicate a taken photo, while a boundary of a solid line may indicate a region outputted through the display unit 151.

While a preview image is displayed, if a photographing command is inputted, like the example shown in FIG. 6 (*b*), the controller 180 can take a photo by capturing an original image. Once the photo is taken, like the example shown in FIG. 6 (*b*), the controller 180 can control a partial region of the taken photo to be outputted in a manner of being enlarged to fit a size of the display unit 151. In doing so, a size and position of a region, which is to be outputted through the display unit, in the taken photo may match a size and position of a region outputted as the preview image in the original image shown in FIG. 6 (*a*). Hence, a user can recognize that the photo is taken as shown in the preview image.

If an editing command for editing the taken photo is received [S407], the controller 180 can control an entire region of the taken photo to be outputted through the display unit 151 [S408]. While the entire region of the taken photo is displayed, a region to be cropped from the entire region of the taken photo can be set. If an editing complete command for the taken photo is received [S409], the controller 180 crops the set region in the entire region of the taken photo and is then able to save a cropped photo [S410].

Specifically, after the taken photo has been deleted, the controller 180 can update the taken photo into the cropped photo (i.e., save the cropped photo with a file name different from that of the taken photo) or may update the taken photo into the cropped photo (i.e., save the cropped photo with the same file name of the taken photo).

FIG. 7 is a diagram for one example of a user interface provided to crop a partial region from an entire region of a taken photo.

Referring to FIG. 7 (*a*), while a partial region of a taken photo is displayed, if a user input for an editing of the taken photo is received, like the example shown in FIG. 7 (*b*), the controller 180 can control an entire region of the taken photo to be displayed.

In this case, the user input for the photo editing may include such a touch input as a pinch-in (i.e., a touch input of narrowing a distance between two pointers currently touching the display unit 151), a long touch (i.e., a touch to the display unit 151 with a pointer over a prescribed time), or a drag with a pointer in a prescribed direction (e.g., top direction, bottom direction, etc.) or may include various input types such as a touch to a photo editing item in a menu list and the like.

If the user input for the photo editing is received, the controller 180 displays the entire region of the taken photo and is also able to control a guide line 710, which encloses a prescribed region to set a region to be cropped from the entire region of the taken photo, to be displayed. A size of the region enclosed by the guide line 710 may be enlarged or reduced in response to a user input and a position of the guide line 710 may be changed by a user.

Figure 8B:
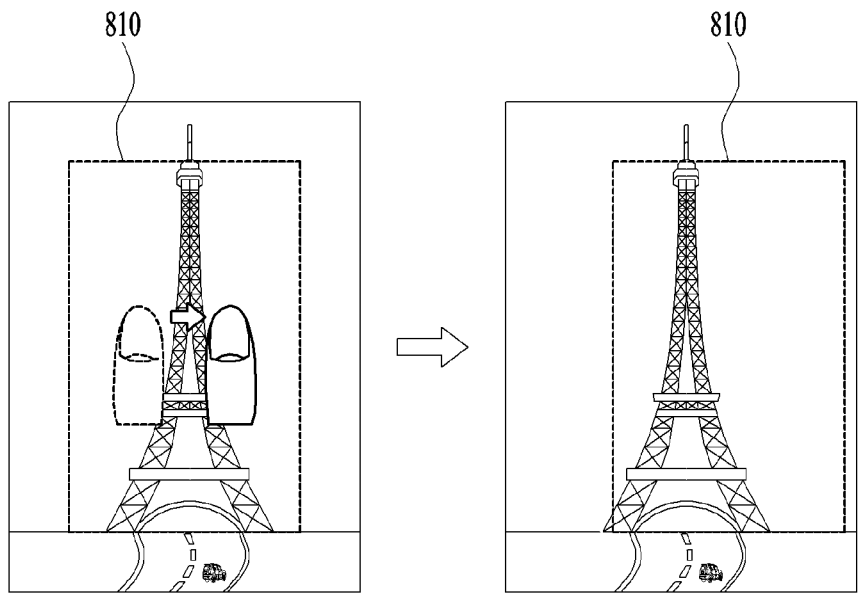
Figure 8C:
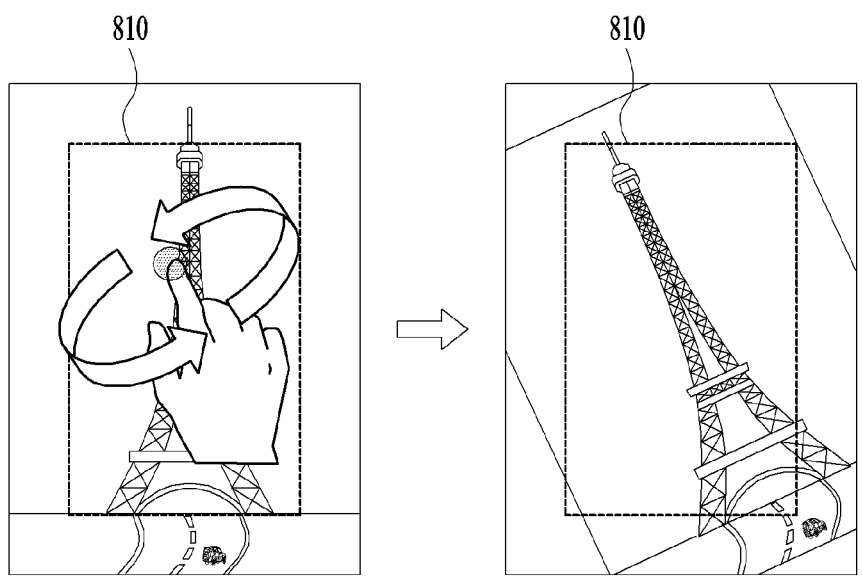

FIGS. 8A to 8C are diagrams for one example of changing a size and location of a region enclosed by a guide line in response to a user input.

Referring to FIG. 8A (*a*), if a pinch-in input is received, the controller 180 can control a size of a region enclosed by a guide line 810 to be decreased in response to the pinch-in input.

On the contrary, referring to FIG. 8A (*b*), if a pinch-out input (i.e., a touch input of increasing a distance between two pointers currently touching the display unit 151) is received, the controller 180 can control a size of a region enclosed by a guide line 810 to be increased in response to the pinch-out input.

In case that a pointer is dragged to move in a prescribed direction, like the example shown in FIG. 8B, the controller 180 can control a position of the guide line 810 (i.e., a position of a region enclosed by the guide line 810) to be changed in pursuit of the pointer moving direction.

Referring to FIG. 8C, in case that two pointers currently touching the touchscreen are rotated clockwise (or counter-clockwise), the controller 180 can control the photo to be rotated in pursuit of the pointer rotated direction while a position and size of the guide line 810 are maintained. Hence, the guide line 810 may indicate a partial region of the rotated photo.

According to the example shown in FIG. 8C, the photo is rotated in response to user's touch input. Yet, it is a matter of course that it is able to control a region indicated by the guide line 810 to be rotated while the photo is fixed thereto.

Referring to FIG. 7, if a user input indicating that the photo editing is complete is received, like the example shown in FIG. 7 (*c*), the controller 180 can crop the region indicated by the guide line 710 (i.e., the region enclosed by the guide line 710) from the taken photo. Hence, a photo finally provided to a user may include a photo generated from cropping at least one portion of the taken photo.

The user input indicating that the photo editing is complete may include an input of pressing a button 'save' shown in FIG. 7, by which the corresponding user input is non-limited. Besides, touch inputs or voices of various types can be assigned for user inputs.

If a region indicated by a guide line contains a region failing to be displayed through the display unit 151, a user can be provided with an effect as if an unseen region is restored after taking a photo. In particular, the mobile terminal 100 according to the present invention can provide a user with an effect of restoring a region regarded as failing to be photographed (i.e., a region failing to be outputted to the display unit 151 in an entire region of a taken photo).

Besides, although the regions enclosed by the guide lines in FIG. 7 and FIGS. 8A to 8C are rectangles for example, it is not necessary for a region enclosed by a guide line to be a rectangle. For example, a guide line may form a circle or a polygon such as a triangle, a star shape, or the like.

If a user input for displaying a photo editing completed photo (i.e., a cropped photo from a taken photo) is received, the controller 180 can control an entire region of the editing completed photo to be displayed.

That is, an editing incomplete photo may be displayed in a manner that a partial region of a taken photo is displayed only like the step S406 shown in FIG. 4, whereas an entire region of an editing complete photo may be displayed.

As mentioned in the foregoing descriptions with reference to FIG. 4 and FIG. 6, in order to display a partial region of a taken photo corresponding to a preview image, it is necessary to save an information on a position to be outputted through the display unit 151. Such position information may be saved as meta data (e.g., EXIF (exchangeable image file format) of the taken photo or data separate from the taken photo.

In doing so, since the position information is further generated, it may cause a problem that more storage space of the memory 160 is consumed. Hence, if a prescribed time expires after taking a photo or a user is determined as not to edit the taken photo, the mobile terminal 100 according to the present invention automatically crops a partial region corresponding to a position of a preview image from an original photo and is then able to save the cropped photo.

For example, if a prescribed time set to automatically crop a partial region corresponding to a position of a preview image from a taken photo is 2 weeks, the controller 180 can crop the partial region corresponding to the position of the preview image from an original photo at the timing point of expiration of 2 weeks since taking the photo. The controller 180 updates the original photo into the cropped photo or may newly save the cropped photo by deleting the original photo.

For another example, despite that a photo taken over prescribed count is displayed, if a user command for a photo editing is not received, the controller 180 regards it as a user has no intention to edit the photo and is then able to crop a partial region corresponding to a position of a preview image from an original photo.

Referring to FIG. 4, if a photographing command is inputted, a photo file of capturing an original image inputted to the camera 121 on inputting the photographing command is created. According to another embodiment of the present invention, in response to a photographing command, the controller 180 takes a plurality of photos, thereby providing a user with the same effect as shown in FIG. 4. This is described in detail with reference to FIG. 9 as follows.

Figure 9:
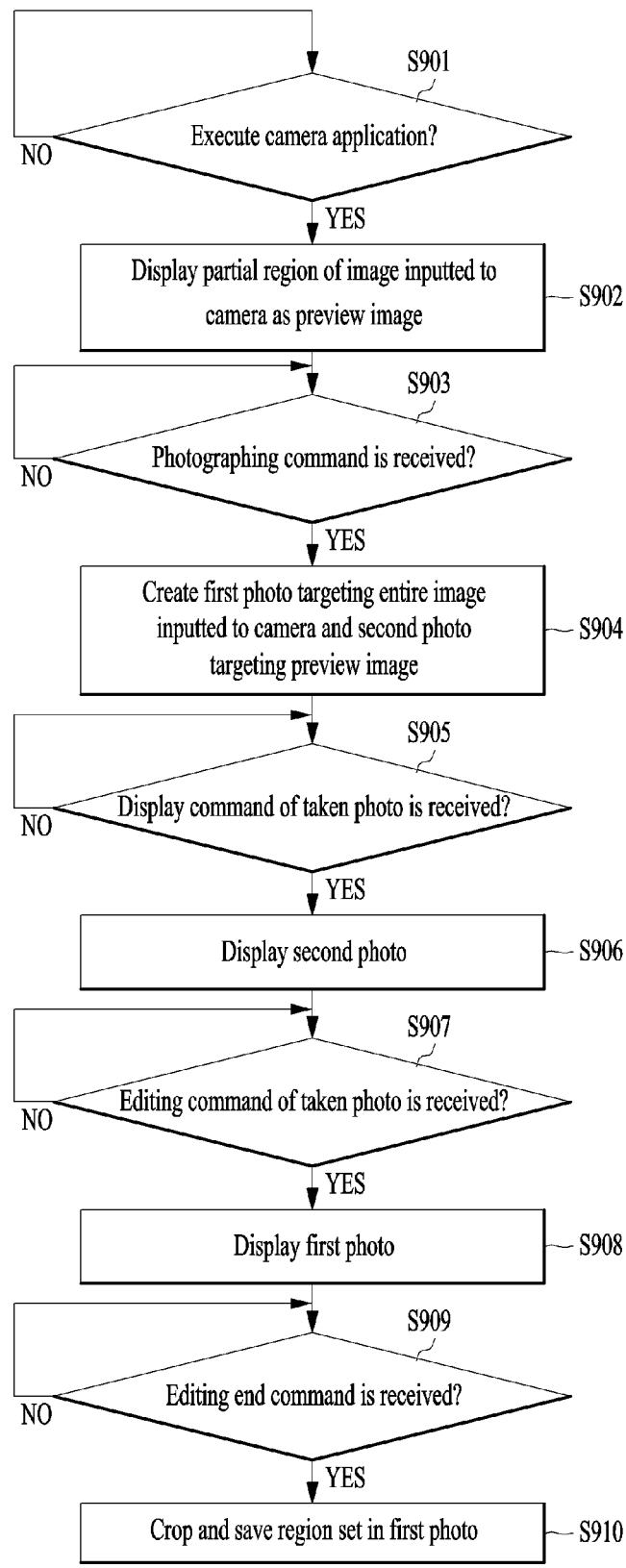
FIG. 9 is another operating flowchart of a mobile terminal according to the present invention.

FIG. 9 is another operating flowchart of a mobile terminal according to the present invention.

First of all, since steps S901 to S903 shown in FIG. 9 correspond to the former steps S401 to S403 shown in FIG. 4, their details shall be omitted from the following description.

If a photographing command is inputted [S903], the controller 180 can create a $1^{st}$ photo of capturing an original image and a $2^{nd}$ photo of capturing a preview image [S904].

FIG. 10 is a diagram for comparison between a first photo and a second photo.

Referring to FIG. 10 (a), a boundary of a dotted line indicates an original image inputted to the camera 121 on receiving a photographing command and a boundary of a solid line indicates a preview image outputted to the display unit 151 on receiving the photographing command. Moreover, FIG. 10 (b) may indicate a $1^{st}$ photo and FIG. 10 (c) may indicate a $2^{nd}$ photo.

Once a photographing command is inputted, like the example shown in FIG. 10 (b), the controller 180 can create a $1^{st}$ photo of capturing an original image and a $2^{nd}$ photo of capturing a preview image. Since the $1^{st}$ photo and the $2^{nd}$ photo may be a photo of capturing the original image and a photo of capturing the preview image, respectively, the $1^{st}$ photo may be a photo of capturing a region in a space wider than that of the $2^{nd}$ photo.

If a user input for displaying a taken photo is received [S905], the controller 180 can control the $2^{nd}$ photo to be outputted through the display unit 151 [S906]. The reason for this is to reflect user's intention desiring to take the preview image intact.

Thereafter, if an editing command for editing the taken photo is received [S907], the controller 180 can control the $1^{st}$ photo to be outputted through the display unit 151 [S908]. While the $1^{st}$ photo is displayed, a region to be cropped from an entire region of the $1^{st}$ photo may be set. If a photo editing complete command is received [S909], the controller 180 crops the set region from the entire region of the $1^{st}$ photo and is then able to save the cropped photo [S910].

Specifically, the controller 180 deletes the $1^{st}$ photo and the $2^{nd}$ photo and may be then able to newly save the cropped photo. Alternatively, the controller 180 deletes the $1^{st}$ photo and may control the $2^{nd}$ photo to be updated into the cropped photo. Alternatively, the controller 180 deletes the $2^{nd}$ photo and may control the $1^{st}$ photo to be updated into the cropped photo. Thus, a photo finally provided to a user may include the photo created by cropping at least one portion of the $1^{st}$ photo.

If a region indicated by a guide line contains a region failing to be displayed through the display unit 151, a user can be provided with an effect as if an unseen region is restored after taking a photo. In particular, the mobile terminal 100 according to the present invention can provide a user with an effect of restoring a region regarded as failing to be photographed.

Referring to FIG. 9, if two photos are taken in response to a photographing command, it may cause a problem that an occupied storage space of the memory 160 is doubled unintendedly. Therefore, if a prescribed time expires from the creation of the $1^{st}$ photo or a user is determined as not to edit the photo, the mobile terminal 100 according to the present invention may control the $1^{st}$ photo to be automatically deleted.

For example, if a prescribed time set to automatically delete the $1^{st}$ photo is 2 weeks, the controller 180 can automatically delete the $1^{st}$ photo at the timing point of expiration of 2 weeks since taking the $1^{st}$ photo.

For another example, despite that the photo taken over prescribed count is displayed, if a user command for a photo editing is not received, the controller 180 regards it as a user has no intention to edit the photo and may be then able to delete the $1^{st}$ photo.

As mentioned in the foregoing description with reference to FIG. 9, if a partial region of a taken photo is displayed by being enlarged instead of an entire region of the taken photo, it may cause a problem that resolution of the corresponding photo is lowered. Moreover, since the $2^{nd}$ photo described with reference to FIG. 9 is the photo of capturing the preview image, it is disadvantageous in having resolution lower than that of the $1^{st}$ photo of capturing the original image. Hence, only if a user desires to take a photo by enduring the risk of the resolution that may be lowered, the controller 180 may apply the former embodiment described with reference to FIG. 4 and FIG. 9.

That is, if the application of the camera 121 is executed initially [S401, S901], the original image inputted to the camera 121 is displayed as a preview image intact. Only if a user input for enlarging the preview image is received, the subsequent steps S402 to S410 or S902 to S910 may be performed. If a photographing command is inputted without receiving a user input for enlarging a preview image, like the conventional mobile terminal 100, a photo file is created by capturing an original image inputted to the camera 121. If a user input for displaying a taken photo is received, an entire region of the taken photo may be displayed.

As mentioned in the foregoing description with reference to FIG. 4 and FIG. 9, the present invention can provide a method of restoring a portion regarded as not photographed after taking a photo. In particular, the controller 180 can control an edited content of a specific photo to be collectively saved to a photo belonging to the same group of the edited photo.

In this case, the photo belonging to the same group of the edited photo may include a photo taken on the same date of the edited photo, a photo taken at the same place of the edited photo (e.g., a photo taken in the same background of the edited photo), a taken photo of the same subject of the edited photo, or at least one of different photos taken by burst shot photographing in case of an edited photo corresponding to one of a plurality of photos created by the burst shot photographing.

In this case, the burst shot photographing may include a photographing performed in a manner of taking a plurality of photos consecutively in prescribed time intervals. While a photographing command is inputted (e.g., while a touch to a shot button shown in FIG. 5 (b) is maintained), the burst shot photographing can be performed in a manner of taking a plurality of photos in prescribed time intervals. Alternatively, the burst shot photographing may be performed in a manner of taking the preset number of photos in prescribed time intervals in response to a photographing command given one time.

In the following description, an embodiment for collectively applying user's editing reference to a plurality of photos belonging to a single group is described in detail with reference to the accompanying drawings.

Figure 11B:
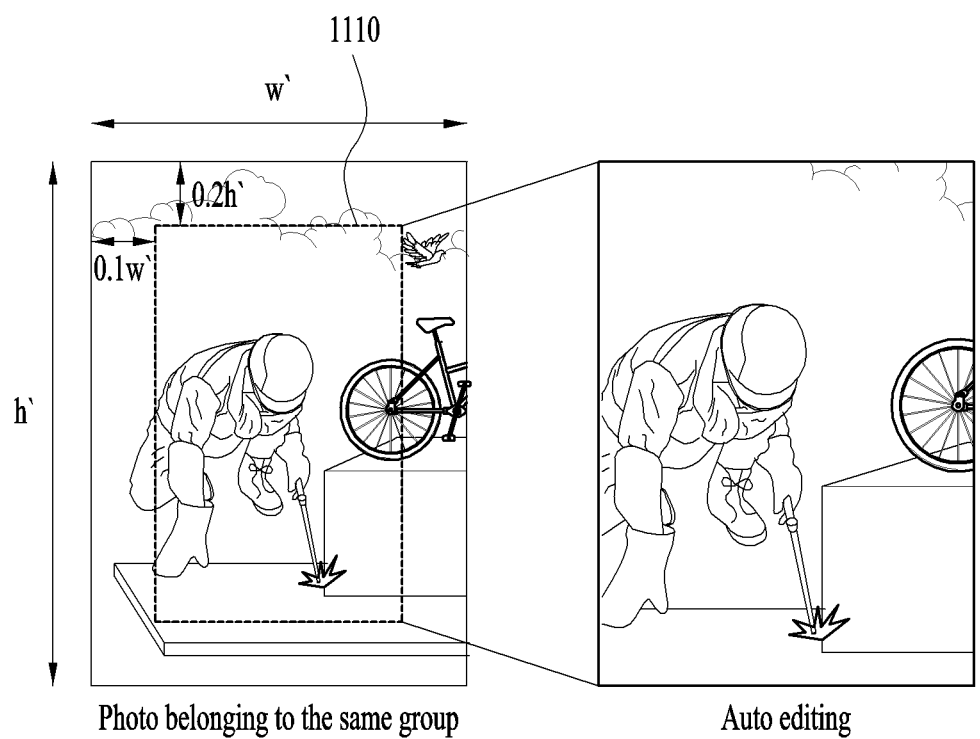

FIG. 11A and FIG. 11B are diagrams for one example that a position of a region to be cropped is collectively applied to a plurality of photos.

For clarity of the following description, assume that a photo shown in FIG. 11A is a photo desired to be edited by a user and that a photo shown in FIG. 11B is a photo belonging to the same group of a photo currently edited by a user.

Referring to FIG. 11A, the controller 180 can control a partial region of an original photo to be outputted through the display unit 151 instead of an entire region of the original photo. In doing so, if a user input for editing a specific photo is received, it is able to restore a portion failing to be outputted through the display unit 151 as well. For instance, like the example shown in FIG. 11A, if a region to be cropped is greater than a region currently outputted through the display unit 151, it provides an advantage as if a region seeming not to be photographed is restored.

In doing so, as mentioned in the foregoing description with reference to FIG. 7 and FIGS. 8A to 8C, a position of the region to be cropped can be adjusted by a user input.

In case that an editing reference of an edited photo is collectively applied to a photo belonging to the same group of the edited photo, like the example shown in FIG. 11B, the controller 180 may apply a position of a cropped region of the edited photo (i.e., a size and position of a region indicated by a guide line 1110) to another photo as it is.

For instance, if a region cropped from a specific photo having width and length set to w and h is spaced apart from a left edge of the specific photo by 0.1 w and spaced apart from a top edge of the specific photo by 0.2 h, like the example shown in FIG. 11B, the controller 180 can automatically crop a rectangular region having one vertex set to a point spaced apart from the left edge and the top edge by 0.1 w and 0.2 h respectively from the same group of the specific photo.

Figure 12B:
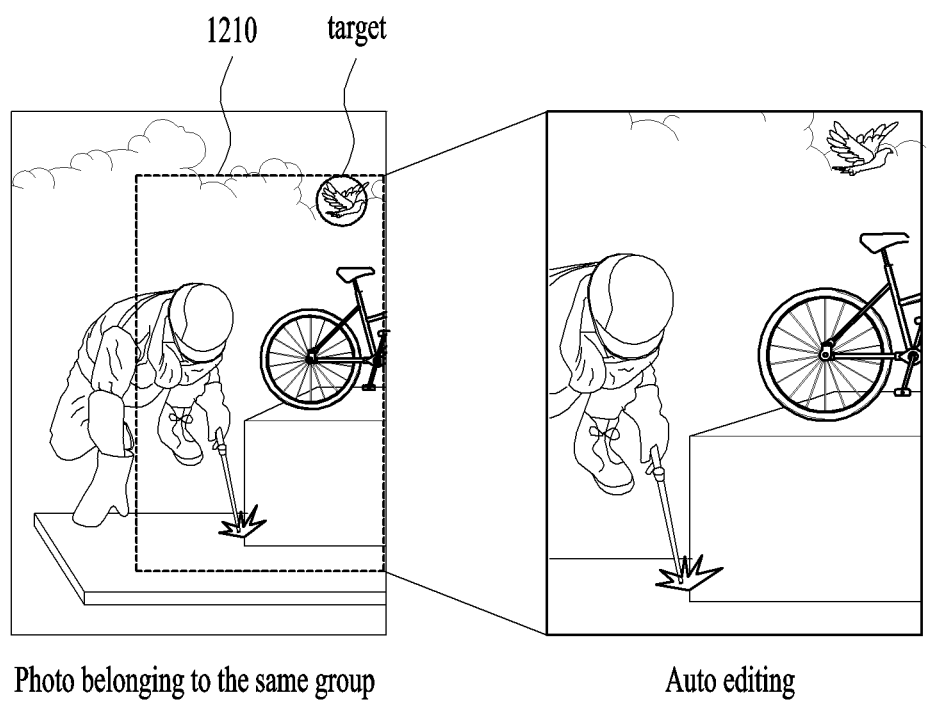

FIG. 12A and FIG. 12B are diagrams for one example of collectively editing a plurality of photos with reference to a target set in a specific photo.

For clarity of the following description, assume that a photo shown in FIG. 12A is a photo desired to be edited by a user and that a photo shown in FIG. 12B is a photo belonging to the same group of a photo currently edited by a user.

Referring to FIG. 12A, the controller 180 can control a partial region of an original photo to be outputted through the display unit 151 instead of an entire region of the original photo. In doing so, if a user input for editing a specific photo is received, it is able to restore a portion failing to be outputted through the display unit 151 as well.

Referring to FIG. 12A, if a region to be cropped is greater than a region currently outputted through the display unit 151, it provides an advantage as if a region seeming not to be photographed is restored.

In the course of editing a specific photo, it is able to set a target for collectively editing a plurality of photos belonging to the same group of the specific photo.

Referring to FIG. 12A, the target can be set to a bird viewed in the background of the specific photo. In this case, like the example shown in FIG. 12B, the controller 180 crops a prescribed region from the photo belonging to the same group of the specific photo and is then able to control the cropped region to contain the bird set as the target.

A target to be applied to a plurality of groups in common may be set manually by a user or automatically by the controller 180. In case of the manual setting by the user, the controller 180 may set the target to an object located at user's touch point.

On the other hand, when a display command for displaying a taken photo is inputted, if a portion failing to be displayed is contained in a cropped region, the controller 180 can automatically set the target to an object contained in the portion failing to be displayed. For instance, according to the example shown in FIG. 11A, since the bird set as the target is located in a region viewable by a user before and after the corresponding editing, it may be automatically set as the target by the controller 180.

Like the examples shown in FIG. 11A, FIG. 11B, FIG. 12A and FIG. 12B, the controller 180 can collectively apply an editing reference for a specific photo to the editing of another photo belonging to the same group of the specific photo.

The mobile terminal 100 according to the present invention can be used to compensate for shaking of the mobile terminal 100 on making a video. If a video making command is inputted, the controller 180 can record a video by cropping a partial region from an image inputted to the camera 121. In doing so, the controller 180 can determine a region to crop per frame in consideration of property of a boundary of a previous frame. This is described in detail with reference to FIG. 13 as follows.

Figure 13B:
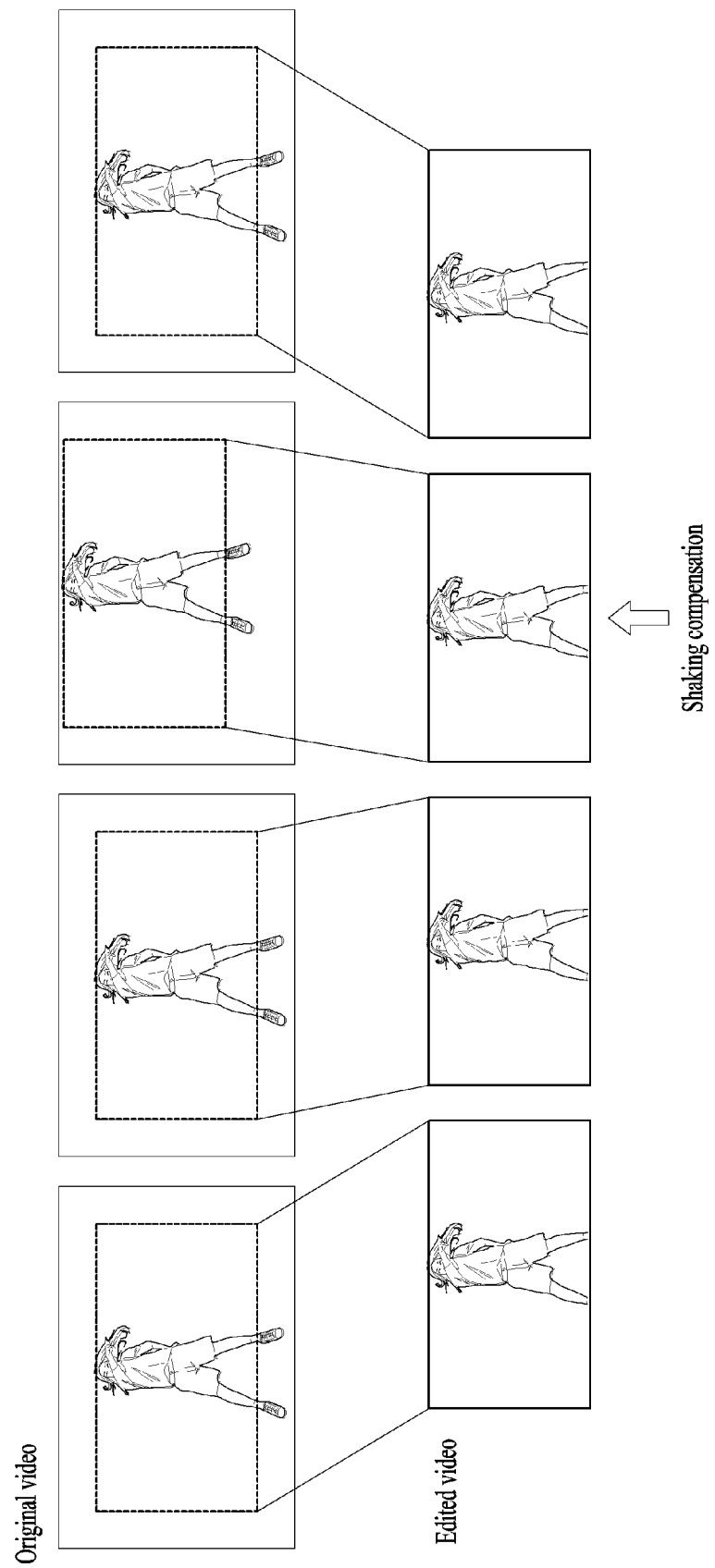

FIG. 13A and FIG. 13B are diagrams for one example to describe a process for determining a region to crop per frame.

FIG. 13A is a diagram for one example of a video in case of skipping a process for compensate for shaking of the mobile terminal 100. FIG. 13B is a diagram for one example of a video in case of applying a process for compensating for shaking of the mobile terminal 100.

The mobile terminal 100 according to the present invention can make a video by cropping a partial region from an image inputted to the camera 121. In doing so, if the same position is cropped from every original frame inputted to the camera 121, like the example shown in FIG. 13A, it is unable to correctly compensate for the shaking of the mobile terminal 100.

To this end, when the controller 180 determines a region to crop from a specific frame, the controller 180 may consider the property on a boundary of a region cropped from a previous frame. In particular, in consideration of the property (e.g., color distribution, definition, brightness, etc.) on the boundary of the previous frame, the controller 180 can select a region to crop from a specific frame. In case of determining a region to be cropped from a specific frame based on the property of a boundary of a region cropped from a previous frame, like the example shown in FIG. 13B, it is able to compensate for the shaking of the mobile terminal 100.

According to one embodiment of the present invention, the above-described method (operating flowchart) can be implemented in a program recorded medium as processor-readable codes. The processor-readable media may include all kinds of recording devices in which data readable by a computer system are stored. The processor-readable media may include ROM, RAM, CD-ROM, magnetic tapes, floppy discs, optical data storage devices, and the like for example and also include carrier-wave type implementations (e.g., transmission via Internet).

While the mobile terminal 100 has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The present invention is applicable to various kinds of electronic devices equipped with cameras.

What is claimed is:

1. A mobile terminal, comprising:
a camera configured to take a photo;
a memory configured to store data;
a display unit configured to display a partial region of an image inputted to the camera as a preview image; and
a controller configured to:
take a photo by targeting an entire image inputted to the camera if a photographing command is inputted,
control a partial region of the taken photo to be displayed if a display command for displaying the taken photo is received,
control an entire region of the taken photo to be displayed through the display unit if an editing command for editing the taken photo is received, and
crop a crop region from the entire region of the taken photo and then save the crop region if the crop region in the entire region of the taken photo is set.

2. The mobile terminal of claim 1, wherein the controller is further configured to control a guide line indicating the crop region to be displayed on the entire region of the taken photo if the editing command for editing the taken photo is received.

3. The mobile terminal of claim 1, wherein a position and size of the crop region are manually adjustable by a user.

4. The mobile terminal of claim 1, wherein the memory is further configured to store a position information on the partial region of the taken photo to be outputted through the display unit.

5. The mobile terminal of claim 4, wherein the position of the partial region of the taken photo is equal to that of the preview image in the image inputted to the camera.

6. The mobile terminal of claim 4, wherein the position information is included in meta information of the taken photo.

7. The mobile terminal of claim 1, wherein the controller is further configured to set the crop region having the same position and size of the crop region of the taken photo in a different photo belonging to the same group of the taken photo.

8. The mobile terminal of claim 1, wherein the controller is further configured to set the crop region to have the specific target included in the different photo belonging to the same group of the taken photo if the crop region includes a specific target.

9. The mobile terminal of claim 7, wherein the different photo belonging to the same group of the taken photo comprises at least one selected from the group consisting of a photo taken on the same state of the taken photo, a photo taken at the same place of the taken photo, and a photo of the same subject of the taken photo.

10. The mobile terminal of claim 7, wherein the different photo belonging to the same group of the taken photo comprises a photo consecutively taken in prescribed time interval.

11. A mobile terminal, comprising:
a camera configured to take a photo;
a memory configured to store data;
a display unit configured to display a partial region of an image inputted to the camera as a preview image; and
a controller configured to:
create a first photo by targeting an entire image inputted to the camera and create a second photo as the preview image if a photographing command is inputted,
control the second photo to be outputted out of the first photo and the second photo if a display command for displaying the taken photo is received,
control the first photo to be displayed through the display unit if an editing command for editing the second photo is received, and
crop a crop region from the entire region of the taken photo and then save the crop region if the crop region in the entire region of the taken photo is set.

12. The mobile terminal of claim 11, wherein after the first photo and the second photo have been created, the controller is further configured to automatically delete the first photo if the editing command for editing the second photo is not received for a prescribed time.

13. The mobile terminal of claim 11, wherein despite that the second photo is displayed over a prescribed count, the controller is further configured to automatically delete the first photo if the editing command for editing the second photo is not received.

14. A method of controlling a mobile terminal, the method comprising:
displaying a partial region of an image inputted to a camera as a preview image;
taking a photo by targeting an entire image inputted to the camera if a photographing command is inputted;
displaying a partial region of the taken photo if a display command for displaying the taken photo is received;
displaying an entire region of the taken photo to through a display unit if an editing command for editing the taken photo is received; and
cropping a crop region from the entire region of the taken photo and then saving the crop region if the crop region in the entire region of the taken photo is set.

15. The mobile terminal of claim 8, wherein the different photo belonging to the same group of the taken photo comprises at least one selected from the group consisting of a photo taken on the same state of the taken photo, a photo taken at the same place of the taken photo, and a photo of the same subject of the taken photo.

16. The mobile terminal of claim 8, wherein the different photo belonging to the same group of the taken photo comprises a photo consecutively taken in prescribed time interval.

* * * * *